(12) United States Patent
White

(10) Patent No.: US 6,962,180 B2
(45) Date of Patent: Nov. 8, 2005

(54) ATTACHMENT FIXTURE FOR MANUFACTURING ELLIPTICAL ARCHES USING A SINGLE-PASS RADIUS MOLDING SYSTEM

(76) Inventor: Rollie Nathaniel White, 400 Cheek Rd., Monroe, GA (US) 30655

(\*) Notice: Subject to any disclaimer, the term of this patent is extended or adjusted under 35 U.S.C. 154(b) by 0 days.

(21) Appl. No.: 10/866,468

(22) Filed: Jun. 14, 2004

(65) Prior Publication Data

US 2005/0005999 A1   Jan. 13, 2005

Related U.S. Application Data

(62) Division of application No. 10/280,718, filed on Oct. 28, 2002.

(51) Int. Cl.$^7$ ............................ B27M 1/00; B27H 1/08; B27B 5/00
(52) U.S. Cl. ...................... 144/360; 144/363; 144/367; 144/3.1; 144/134.1; 144/137

(58) Field of Search .......................... 144/136.1, 144.1, 144/144.51, 145, 1, 1.1, 2.1, 360, 363, 367, 144/372; 30/290, 300, 310; 83/733; 33/30.1–31

(56) References Cited

U.S. PATENT DOCUMENTS

| | | | | |
|---|---|---|---|---|
| 4,306,598 A | * | 12/1981 | Peot ........................ | 144/136.95 |
| 4,552,193 A | * | 11/1985 | Armas ...................... | 144/144.52 |
| 4,986,152 A | * | 1/1991 | Sammons ........................ | 83/13 |
| 5,555,631 A | * | 9/1996 | Houston ........................ | 33/31 |

\* cited by examiner

*Primary Examiner*—Derris H. Banks
*Assistant Examiner*—Shelley Self
(74) *Attorney, Agent, or Firm*—Rodgers & Rodgers

(57) ABSTRACT

The present invention is an attachment fixture that is used in conjunction with a single-pass radius molding system to manufacture elliptical arches. The attachment fixture includes a vertical beam, a horizontal self-centering rack mounted at top end of the vertical beam, a swivel base attached at bottom end of the vertical beam, and a holding clamp attached to the swivel base.

3 Claims, 4 Drawing Sheets

1

ATTACHMENT FIXTURE FOR MANUFACTURING ELLIPTICAL ARCHES USING A SINGLE-PASS RADIUS MOLDING SYSTEM

This is a divisional application of application Ser. No. 10/280,718 filed Oct. 28, 2002.

FIELD OF THE INVENTION

The present invention generally relates to manufacture of arches for windows and doors. More specifically, the invention relates to systems and methods for producing an elliptically shaped arch.

BACKGROUND OF THE INVENTION

Manufacture of door and window arches involves cutting the inner and outer surfaces of the arch as well as the decorative face or profile of the arch. These cuts are typically achieved by a sequence of cutting operations that often lead to imperfections in the finished product. While the manufacture of an arch that is semi-circular in shape using such sequential operations, together with the associated imperfections, is time consuming and expensive, the manufacture of an elliptically shaped arch becomes even more difficult. This is because an elliptical cut incorporates multiple radii during the cutting process, unlike a semi-circular cut that requires a single radius setting for the cutting element.

Elliptical arch cutting using traditional processes produces distinctly visible imperfections such as jagged edges and non-planar surfaces. As an example of an imperfection, the cut surface becomes burred and pitted at points where the cutting operation has been stopped and re-started, possibly due to a requirement to change the cutting elements that are used for the different sequences.

A single-pass cutting process that provides a smooth transition, with no noticeable imperfections at various curvature points of an ellipse, is therefore desirable in the manufacture of an elliptical arch.

The described invention, which is an attachment fixture that is used in conjunction with a single-pass radius molding system, is designed to satisfy the requirements needed to manufacture such an elliptical arch.

SUMMARY OF THE INVENTION

The present invention is an attachment fixture that is used in conjunction with a single-pass radius molding system to manufacture elliptical arches. The attachment fixture includes a vertical beam, a horizontal self-centering rack mounted at top end of said vertical beam, a swivel base attached at bottom end of said vertical beam, and a holding clamp attached to said swivel base.

Also described is a method for cutting an elliptical arch on a panel, comprising the steps of activating a first clamp to secure hold on said panel at a first anchor position, using a cutting means to produce a first cut of a first radius, activating said first clamp to release hold on said panel, activating a second clamp to secure hold on said panel at a second anchor position, using said cutting means to produce a second cut of a second radius, activating said second clamp to release hold on said panel, activating said first clamp to secure hold on said panel at a third anchor position, and using said cutting means to produce a third cut of a third radius.

DESCRIPTION OF THE DRAWINGS

Many aspects of the invention can be better understood with reference to the following drawings. The components in the drawings are not necessarily drawn to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
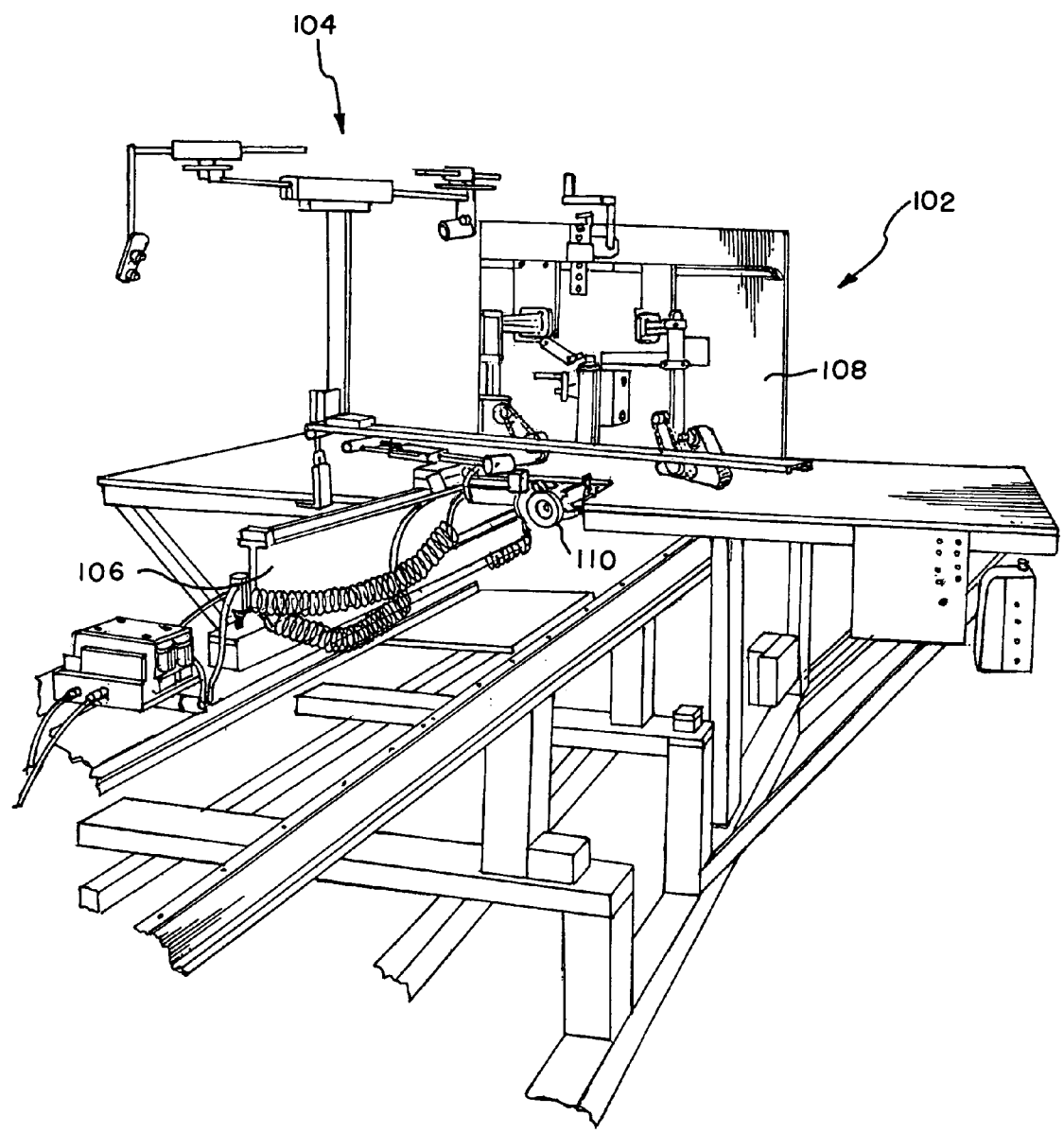
FIG. 1 is a perspective view of the attachment fixture of this invention, attached to a single-pass radius molding system.

Reference will be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 is a perspective view of the attachment fixture 104 of this invention, attached to a single-pass radius molding system 102. The single-pass radius molding system 102 comprises multiple horizontal and vertical beams interconnected to form a base platform for the attachment fixture 104, which is specifically mounted on a horizontal bottom rail 106. The horizontal bottom rail 106 permits the attachment fixture 104 to move horizontally, back and forth, with respect to the backboard 108 of molding system 102.

Molding cutter 110 is a rotary cutting tool that is vertically positioned and suitably driven by a motor drive mechanism that is not shown in FIG. 1.

Figure 2:
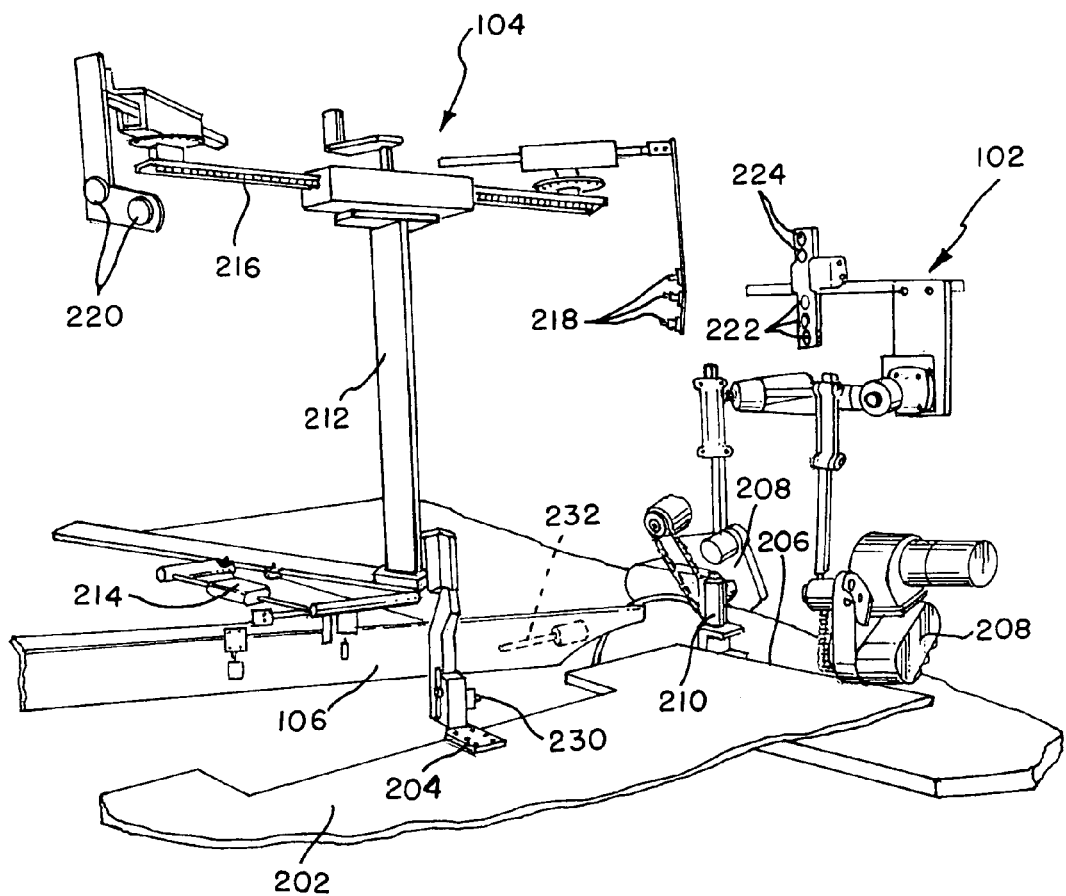
FIG. 2 is a perspective view of the attachment fixture of this invention together with certain elements of the single-pass radius molding system that interact with the attachment fixture.

FIG. 2 is a perspective view of the attachment fixture 104 of this invention together with certain elements of the single-pass radius molding system 102 that interact with the attachment fixture 104. Panel 202 constitutes the work material upon which the elliptical cut is implemented to produce the elliptical arch. Panel 202 is secured to the attachment fixture 104 via holding clamp 204 which acts as a pivoting mechanism when the panel 202 is swung in a counter-clockwise motion with a cutting radius r2, along a first horizontal plane.

Cutting contact is provided by a molding cutter 110 that is located substantially below the level of the first horizontal plane. A cutting element that is mounted on the molding cutter 110 is positioned at the same level as the first horizontal plane. This cutting element is used to effect a cut on panel 202. The cut originates at edge 206 and progresses in a clockwise direction as the panel 202 is rotated counter-clockwise past the molding cutter 110. Panel 202 is rotated counter-clockwise by the roller feeders 208 that are components of the radius molding system 102.

Holding clamp 210 acts as a second pivoting mechanism, similar to holding clamp 204, and is used to anchor the panel 202 when modifying the cutting radius to a value r1, to produce an elliptical cut.

Attachment fixture 104 is formed of a horizontal self-centering rack 216 that is attached on top of a vertical beam 212. Horizontal self-centering rack 216 rotates horizontally in tandem with the counter-clockwise movement of panel 202. This rotation is facilitated by the swivel base 214 upon which vertical beam 212 is mounted.

The two sets of magnet-assemblies 218, 230, and 220, rotate in a counter-clockwise direction when self-centering rack 216 rotates. Magnet-assembly 218 is vertically aligned to be located on the same horizontal plane as magnet-assembly 222 that is a part of the radius molding system 102. In a similar fashion, magnet-assembly 220 is vertically aligned to be located on the same horizontal plane as magnet-assembly 224 that is a part of the radius molding system 102.

Magnet-assembly 230 is vertically aligned to be located on the same horizontal plane as magnet-assembly 232 which is located behind the horizontal bottom rail 106, and is a part of the attachment fixture 104.

As self-centering rack 216 rotates in a counter-clockwise direction, magnet-assembly 218 moves past magnet-assembly 222, and the magnetic interaction between magnet-assembly 218 and magnet-assembly 222 generates a first set of trigger signals. This is followed by a second set of trigger signals generated by the magnetic interaction between magnet-assembly 230 and magnet-assembly 232. This second set of trigger signals is followed by a third set of trigger signals that are generated when magnet-assembly 220 moves past magnet-assembly 224 and a magnetic interaction is created.

The first set of trigger signals is utilized by the single-pass radius molding system 102 to energize activating mechanisms (not shown in FIG. 2) that cause clamp 210 to activate in securing panel 202, to generate a cut of a first radius r1 using clamp 210 as the pivoting mechanism. Once this cut is completed, clamp 210 is activated to release its hold upon panel 202, and pivoting control is transferred to clamp 204. Clamp 210 is then swiveled down, thereby moving it out of the path of the panel 202 that is being rotated in a counter-clockwise direction. Once pivoting control is transferred to clamp 204, a cut of a second radius r2 is generated using clamp 210 and the associated attachment fixture 104 that provides an adjustable pivoting mechanism.

The second set of trigger signals is used to return clamp 210 to its upright position after clamp 204 has traveled past the cutter 110.

The third set of trigger signals causes the clamp 210 to be activated in securing panel 202 for the second time. The cutting process used in producing the cut of the first radius is replicated to produce a cut of a third radius r1. The radius of the third cut is the same as the radius of the first cut.

Figure 3:
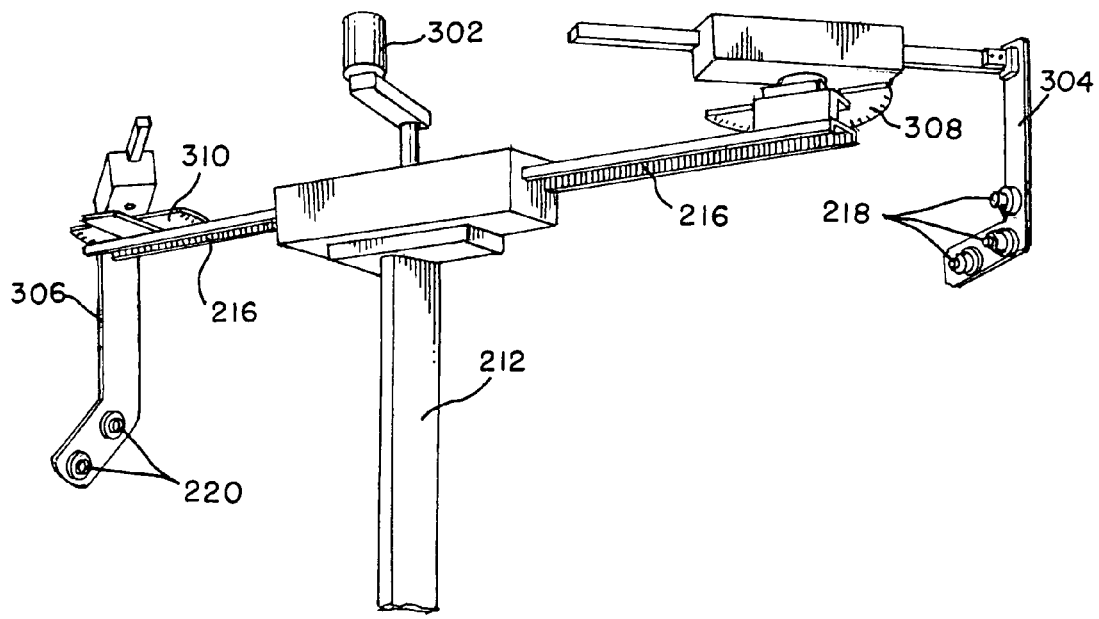
FIG. 3 is a perspective view of the self-centering rack of the attachment fixture of this invention.

FIG. 3 is a perspective view of the self-centering rack 216 of the attachment fixture 104 of this invention. Rotating handle 302 is used for horizontally positioning the self-centering rack 216 with reference to vertical beam 212. The magnet-assembly 218 is mounted on the vertical member 304. The three magnets that comprise magnet-assembly 218 are laterally separated from each other in such a manner that upon the rotation of the self-centering rack 216, the magnetic interaction of the first magnet of magnet-assembly 218 with the magnet-assembly 222 causes the rotation of the panel 202 to be slowed down as the cut of the first radius r1 nears completion. At this point in time, panel 202 secured by clamp 210, has been rotated past the cutter 110.

The magnetic interaction of the second magnet of magnet-assembly 218 with the magnet-assembly 222 causes the rotation of the panel 202 to be stopped. After panel 202 has stopped, clamp 210 is activated to release its hold on panel 202 and holding clamp 204 is activated so as to hold panel 202. During the brief interval between the activation of clamp 210 and the activation of clamp 204, panel 202 is supported by roller feeders 208 which are stationary as the rotation of the panel 202 has been stopped. Once clamp 204 holds panel 202, roller feeders 208 are activated and the rotation of panel 202 is resumed at normal speed.

The magnetic interaction of the third magnet of magnet-assembly 218 with the magnet-assembly 222 causes clamp 210 to swivel down thereby moving it out of the path of the panel 202 that is being rotated in a counter-clockwise direction.

Magnet-assembly 230 then interacts with magnet-assembly 232 to generate the second set of trigger signals, which is used by the single-pass radius molding system 102, to return clamp 210 to its upright position after clamp 204 has traveled past the cutter 110.

The magnet-assembly 220 is mounted on the vertical member 306. The two magnets that comprise magnet-assembly 220 are laterally separated from each other in such a manner that upon the rotation of the self-centering rack 216, the magnetic interaction of the first magnet of magnet-assembly 220 with the magnet-assembly 224 causes the rotation of the panel 202 to be stopped. After panel 202 has stopped, clamp 204 is activated to release its hold on panel 202 and holding clamp 210 is activated so as to hold panel 202. During the brief interval between the activation of clamp 204 and the activation of clamp 210, panel 202 is supported by roller feeders 208 which are stationary as the rotation of the panel 202 has been stopped. Once clamp 210 holds panel 202, roller feeders 208 are activated and rotation of panel 202 is resumed at normal speed to produce the cut of the third radius, thereby completing the elliptical cut on the panel 202.

Protractor 308, which is associated with the vertical member 304, may be rotated horizontally and locked into a desired position. The rotation and subsequent locking action is carried out upon protractor 308, by an operator setting up the attachment fixture 104 for producing an elliptical arch from panel 202. The setting on protractor 308 influences the transition from the first cutting radius to the second cutting radius, while the setting of protractor 310 is similar to protractor 308 and influences the transition from the second cutting radius back to the first cutting radius of attachment fixture 104.

Figure 4:
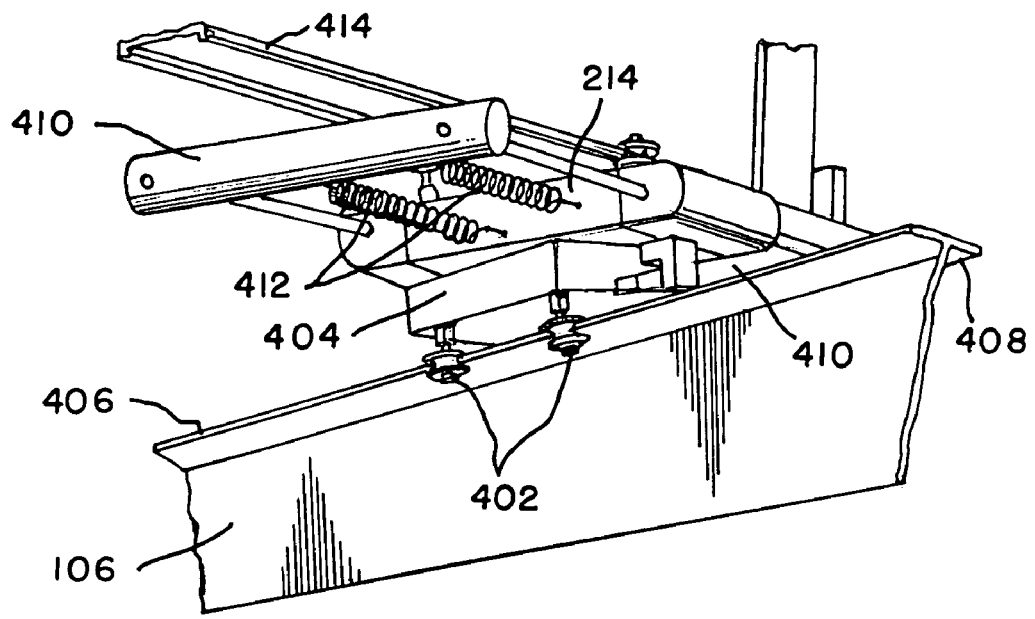
FIG. 4 is a perspective view from below of the swiveling platform located at the base of the attachment fixture of this invention.

FIG. 4 is a perspective view from below of the swivel base 214 located at the base of the attachment fixture 104 of this invention. Swivel base 214 moves horizontally along the horizontal bottom rail 106, using four roller wheels 402, which are substantially located on the four corners of sliding platform 404. Two of the four roller wheels 402 make rolling contact with horizontal bottom rail 106 on one side along edge 406, while the other two roller wheels 402 make rolling contact with the horizontal bottom rail 106 along edge 408 that is parallel to edge 406.

Swivel base 214 is attached to sliding platform 404 through a centrally located axis that comprises of ball-bearings that permit swivel base 214 to swivel with respect to sliding platform 404. A pneumatically-operated locking bar 410 is used to lock swivel base 214 to sliding platform 404. Top rail 414 is attached to swivel base 214 as shown in FIG. 4. The action of locking the swivel base 214 to sliding platform 404 is accompanied concurrent to activating a locking mechanism (not shown) to lock swivel base 214 to the top rail 414.

Swivel controller 410 is a spring-loaded activating mechanism that causes swivel base 214 to rotate in a counter-clockwise direction. As part of the initial setup procedure, an operator extends the swivel controller 410, causing the springs 412 to expand. This action causes the horizontal self-centering rack 216 which is attached to the top rail 414 via vertical beam 212, to be positioned at a 90 degree angle with reference to the horizontal bottom rail 106. The contracting action of springs 412 cause the swivel base 214 to rotate more freely in a counter-clockwise direction.

Figure 5:
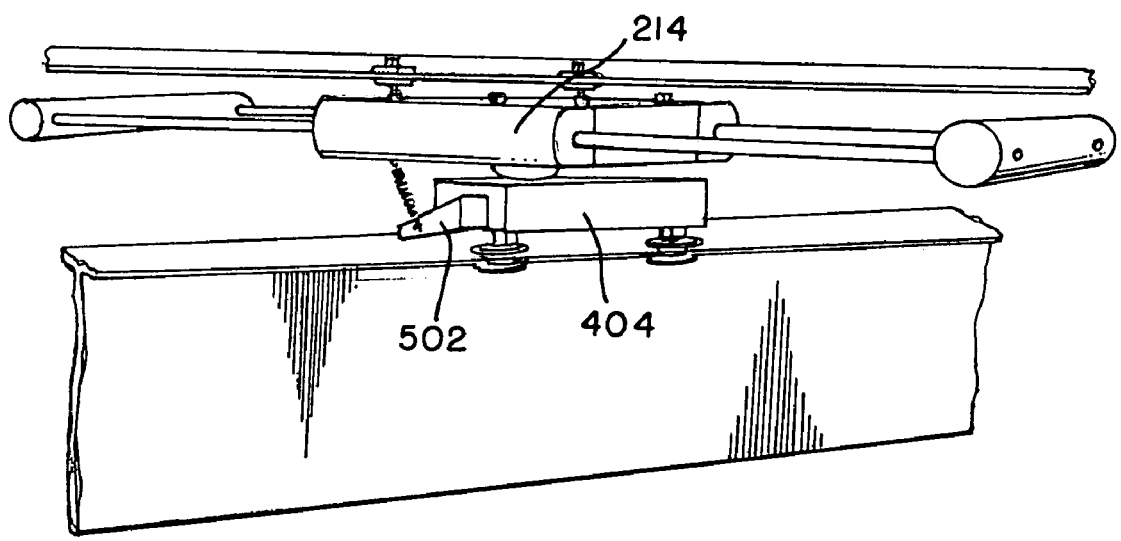
FIG. 5 is a perspective view from the side of the swiveling platform of FIG. 4.

FIG. 5 is a perspective view from the side of the swivel base 214. Pneumatically-activated locking bar 502 is used to lock the sliding platform 404 to the horizontal bottom rail 106. This action is carried out so as to anchor the attachment fixture 104 in a fixed position that provides the desired cut of a second radius r2. Unlocking the sliding platform 404 allows panel 202 to move freely, and accomodate a self-aligning action of sliding platform 404 which then moves along the horizontal bottom rail 106. Self-aligning platform 404 adapts a position that is suitable for producing the cut of a first radius r1, and for producing the cut of a third radius r1.

Figure 6:
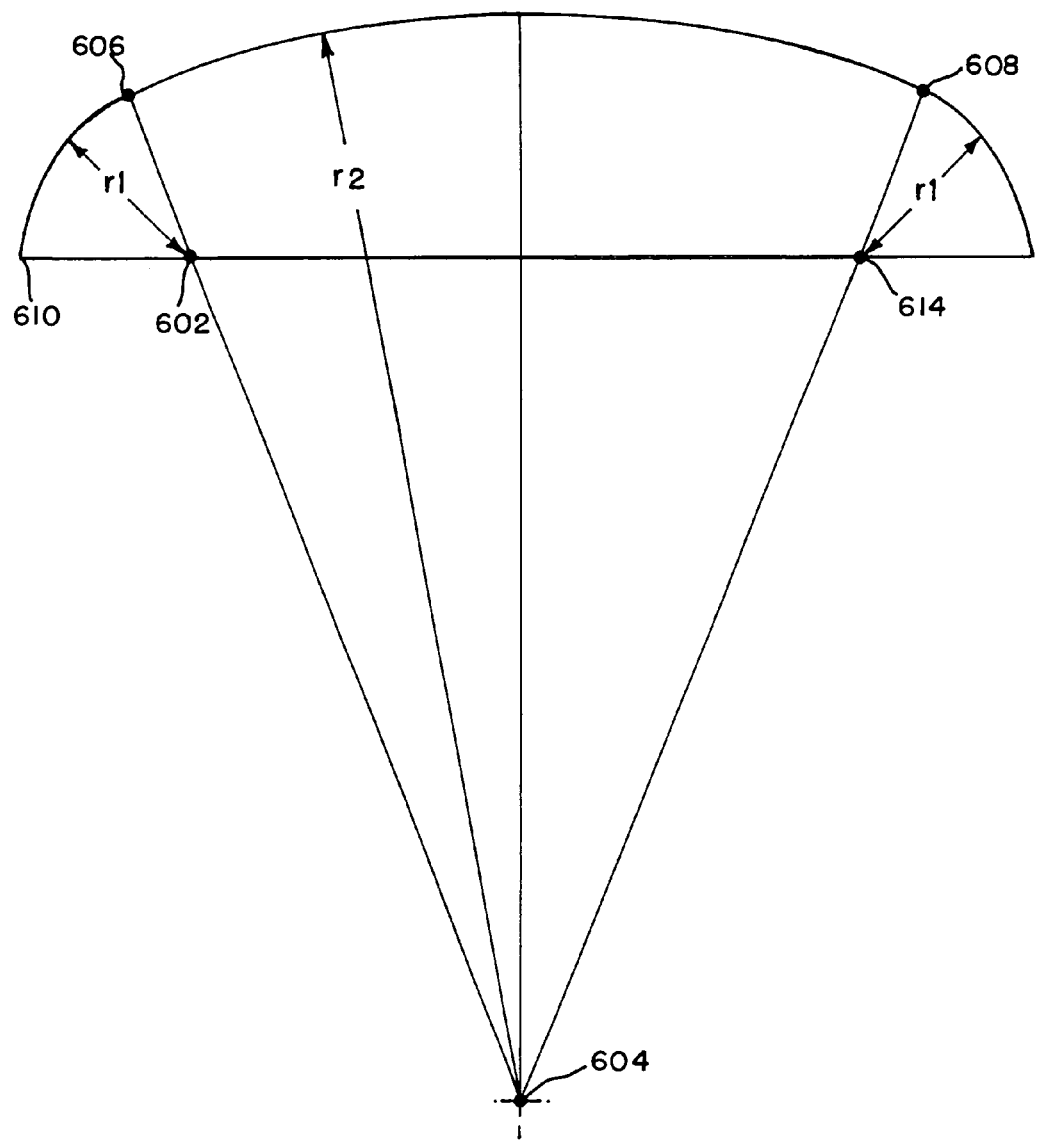
FIG. 6 illustrates the principles involved in creating an elliptical arch using the attachment fixture of the present invention.

FIG. 6 illustrates the principles involved in creating an elliptical arch using the attachment fixture 104 of the present invention. The attachment fixture 104 is located at first anchor position 602 using clamp 210 at the start of the cutting operation process. As the panel 202 is rotated counter-clockwise, the cutting element of the molding cutter 110 begins cutting panel 202 at a spot corresponding to arch periphery location 610. Cutting proceeds at radius value r1 that is related to the angle setting on protractor 308. After the cut has been made up to arch periphery location 606, the attachment fixture 104 is positioned, under control of the single-pass radius molding system 102, to second anchor position 604 which lies along the axis of the horizontal bottom rail 106. This positioning is carried out during the interaction of magnet-assembly 218 with magnet-assembly 222, as described earlier.

This action causes the cutting radius to be changed to a radius value r2 that is related to the angle setting on protractor 310. Cutting proceeds at radius value r2 using clamp 204, after clamp 210 is activated to release its hold on panel 202, until arch periphery location 608 is reached. At this stage of the cutting process, the attachment fixture 104 is again repositioned, under control of the single-pass radius molding system 102, to a third anchor position 614. Clamp 204 is activated to release its hold on panel 202, clamp 210 is activated to hold panel 202, and the cut is completed with the radius value r1.

It should be emphasized that the above-described embodiment of the present invention is merely a possible example of an implementation and is merely set forth for a clear understanding of the principles of the invention. Many variations and modifications may be made to the above-described embodiment of the invention without departing substantially from the spirit and principles of the invention. All such modifications and variations are intended to be included herein within the scope of the present invention and protected by the following claims.

What is claimed is:

1. A method for cutting an elliptical arch from a panel, comprising the steps of: activating a first clamp to secure hold on said panel at a first anchor position; using a cutting means to produce a first cut of a first radius; activating said first clamp to release hold on said panel; activating a second clamp to secure hold on said panel at a second anchor position; using said cutting means to produce a second cut of a second radius; activating said second clamp to release hold on said panel; activating said first clamp to secure hold on said panel at a third anchor position; and using said cutting means to produce a third cut of a third radius.

2. The method of claim 1, wherein said third radius is equal to said first radius.

3. The method of claim 2, wherein said first cut begins at a first location of said panel and ends at a second location of said panel, said second cut begins at said second location of said panel and ends at a third location of said panel, and said third cut begins at said third location of said panel and ends at a fourth location of said panel.

* * * * *